Dec. 15, 1959  J. L. MEIJERING ET AL  2,916,814
MANUFACTURE OF POROUS ARTICLES OF PREDETERMINED SHAPE
AND DIMENSIONS FROM HIGH-MELTING-POINT METALS
Filed Dec. 28, 1956
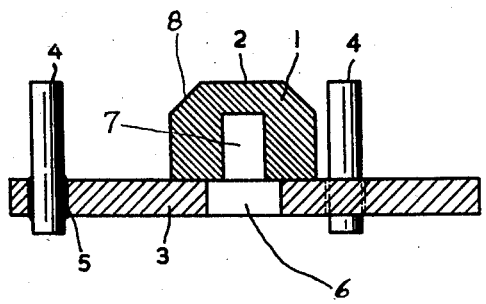
INVENTOR
JAN LAURENS MEIJERING
GODEFRIDUS HENRICUS BROERS
BY
AGENT United States Patent Office 2,916,814
Patented Dec. 15, 1959

2,916,814

MANUFACTURE OF POROUS ARTICLES OF PREDETERMINED SHAPE AND DIMENSIONS FROM HIGH-MELTING-POINT METALS

Jan Laurens Meijering and Godefridus Henricus Broers, Eindhoven, Netherlands, assignors, by mesne assignments, to North American Philips Company, Inc., New York, N.Y., a corporation of Delaware Application December 28, 1956, Serial No. 631,323

Claims priority, application Netherlands January 21, 1956

3 Claims. (Cl. 29—424)

This invention relates to the manufacture of porous articles of predetermined shape and dimensions from high-melting point metals. In particular, it relates to a method of machining a porous, tungsten body to a desired shape, and to machinable bodies made by said method.

United States Patent No. 2,669,008 describes a method of machining porous, tungsten articles, which articles have been produced by compressing and sintering at a very high temperature tungsten powders to form an extremely hard, porous body with such a degree of porosity and hardness that satisfactory machining by the usual material-removing operations, such as drilling, turning, or grinding, is practically impossible. In accordance with the invention of said patent, the porous tungsten body is first impregnated with a filler metal selected from the group of copper, silver, gold and alloys thereof. It is then found that the impregnated, porous body is readily machinable by use of standard machining techniques. After the machining step, the filler metal in the pores of the tungsten body is removed by volatilization in vacuum, leaving the original, porous, tungsten body having the desired shape and dimensions.

This technique, however, was found to possess certain drawbacks. In particular, there are applications of the tungsten body which require that the shaping or machining operation follow its mounting on a suitable support. This leads to the difficulty that, while the tungsten body itself is able to withstand the elevated temperature required to remove the filler metal in its pores after machining, this may not be the case for the support itself. Further, the volatilized filler metal may deposit on the support and deleteriously react with portions thereof to the detriment of the end product. Still further, the high cost of silver and gold, since the volatilized filler metal is difficult to reclaim, tends to cause utilization of the less-expensive copper. Due to the high melting point of the latter, at a temperature of 1900° C., a vapor pressure of only 1 mm. of Hg is achieved. In view of this low vapor pressure, volatilization of the copper in vacuum becomes essential, which requires the use of extremely expensive, vacuum furnaces, rather than the relatively inexpensive furnace adapted to operate at atmospheric pressure, say with an inert gas. Finally, the time required to carry out the volatilization step in vacuum is quite long, due to the slower rate of cooling of a vacuum furnace.

The chief object of the invention is to provide a new method for machining porous, refractory metal bodies enabling lower temperatures and a more favorable environment to be employed.

Briefly, the invention is based upon the discovery that a porous, refractory metal body containing certain non-metal fillers in its pores is capable of being machined at room temperature by standard machine tool operations. Specifically, in a preferred embodiment, the method of the invention involves filling the pores of a tungsten body with a metal halide, such as an alkali halide, performing the machining operation of the thus-impregnated tungsten body in the usual way, followed by removal of the alkali halide preferably by volatilization.

The invention will now be described in greater detail with reference to the accompanying drawing, the sole figure of which shows a cross-sectional view of a porous, tungsten body mounted on a support, the combination constituting part of an electrode of an electric discharge device.

Referring now to the drawing, the sole figure thereof shows a cathode electrode and support construction for a disc seal type of high-frequency, discharge tube prior to assembly of the completed tube. The construction shown comprises a disc-like support or plate 3 of molybdenum, for example, having a central aperture 6 over which is mounted a porous, tungsten body 1 by welding to the disc 3. In symmetrically distributed apertures provided in the disc 3 are secured three sapphire rods 4, only two of which are shown. The sapphire rods 4 are secured in the position shown by being soldered with platinum 5 to the disc 3.

In the manufacture of the construction shown in the drawing, there is first provided the molybdenum plate 3 with the correctly-sized apertures therein. A porous, tungsten plug of cylindrical shape is made by pressing and sintering to a very high temperature, such as 2300° C., tungsten powders of the proper particle size and distribution to produce a hard, tungsten body of the required strength and density, e.g., 80%, and having a myriad of tiny, uniformly-distributed, inter-connecting pores, which body, by reason of its fine pore structure, will form the emissive part of a thermionic dispenser cathode as described in United States Patent No. 2,543,728. Because of the high sintering temperature, the resultant tungsten body is normally unmachinable by ordinary techniques. In its completed form, the cathode includes a supply of alkaline earth metal oxides located adjacent the tungsten, and which, when heated, reacts with the tungsten to generate free, alkaline earth metal, which then diffuses and flows through the interconnected pores to form a monatomic layer on an exposed surface of the body. Continuing now with the description of the manufacture, the tungsten plug 1 is welded to the disc 3 in position over the aperture 6. Then, the sapphire rods 4 are soldered in position in the apertures in the disc 3. In order to provide the tungsten plug with a central aperture 7, as well as the tapered end 8, in accordance with the invention, the body 1 is impregnated with molten, alkali halide, such as, for example, sodium chloride, which is then allowed to solidify in the pores. The impregnated plug is then machined to produce the shape shown in the drawing. For example, the center aperture 7 is produced by a drilling operation, whereas the taper 8 is formed by a milling operation. An essential requirement of the structure shown in the drawing is that the top surfaces of the sapphire rods 4 and the tungsten member 1, which latter surface is indicated by the reference numeral 2, must lie precisely in the same plane. To this end, the plate 3 with the supported rods and impregnated tungsten body is mounted in a surface grinding machine, and the top surfaces of the rods and the tungsten member simultaneously ground until they are perfectly flat and co-planar. In this connection, it is to be noted that grinding, as well as polishing, is to be considered as a machining operation, because had the alkali halide filler been absent, the pores at the surface 2 of the body 1 would be smeared over and possibly closed, or at least its dimensions and distribution affected in a detrimental manner. In other words, satisfactory grinding of the porous, tungsten member would not have been possible in the absence of the alkali halide filler.

Thereafter, the structure is placed within a furnace and heated to an elevated temperature in the presence of a non-oxidizing atmosphere which will not react unfavorably with the tungsten or the non-metal filler. These atmospheres include inert atmospheres, such as vacuum, nitrogen or any of the rare gasses. It may also include in certain cases reducing atmospheres, such as hydrogen. For example, when using the sodium chloride, hydrogen is satisfactory because it does not cause decomposition of the salt and thus detrimental reaction of the resultant chloride with the tungsten. At this elevated temperature, the sodium chloride is volatilized and thus expelled completely from the tungsten body. The manufacture is now complete, and the assembly is then mounted in a discharge tube, and to it, in the apertures 6 and 7, are secured the oxides and a heating filament for the resultant cathode.

With the above-described technique, it has been found a relatively simple operation to produce the structure illustrated in the drawing. The machining of the impregnated body at room temperature is straightforward, which is truly a remarkable and unexpected result in view of the fact that solid, sodium chloride is a fairly brittle material. Thus, a striking result of the invention is that filling the pores of a hard, brittle body like tungsten with an alkali halide, which is itself brittle, has enabled the resultant body to be readily machined by standard techniques. Another advantage is that the temperature required for removing the sodium chloride by volatilization is not detrimental to the soldered connection between the sapphire rods 4 and molybdenum disc 3. Finally, the volatilized sodium chloride, when deposited on the platinum solder, does not react therewith and hence the solder joint remains unaffected.

In contrast, had the manufacture of the same construction been attempted with the use of copper in the pores of the tungsten body to render it machineable, it would have been found that the volatilized copper would creep along and reach the platinum solder, interact therewith and destroy the solder connection. Hence, the invention has made possible the manufacture of new articles, which heretofore either would have been impossible or prohibitively costly.

The requirements that must be satisfied by the non-metal filler for the porous body are: (1) it must have a relatively low melting point as compared to the material of the porous body, so that impregnation from the melt is readily effected without harming the porous body; (2) it should have a relatively high vapor pressure at reasonably low temperatures, so that expelling of the filler non-metal can preferably be experienced in an inert atmosphere at atmospheric pressure; (3) it should preferably not contain oxygen or other elements which would oxidize or attack the tungsten at the elevated temperatures involved, since this would impair the functioning of the tungsten in the completed cathode; (4) it should not be hygroscopic to an extent that the absorption and retention of moisture causes leaching out of the filler; (5) it should wet the tungsten when molten, and thus be able to enter the pores by capillary action; (6) finally, it should enable the porous body to be machined when filling its pores. Only few non-metal materials have been found to fulfill these requirements and have thus proven satisfactory. The most usable materials have been found among inorganic salts, and of this group, the metal halides represent the largest class. Specifically, satisfactory results are possible with a non-metal filler chosen from the alkali halide group and constituted of one of the following substances: sodium chloride, sodium fluoride, potassium chloride, potassium bromide, potassium iodide, rubidium chloride, rubidium bromide, rubidium iodide, cesium bromide and cesium iodide. Of these materals, sodium chloride in the form of ordinary table salt is preferred because of its low cost and excellent properties. For example, it melts at 800° C.; hence, impregnation is readily carried out by heating at or above this temperature. For example, in the specific example described above, the sodium chloride was placed beneath the porous, tungsten body 1, and the combination placed in an ordinary, open, bell-jar type of furnace, and heated at 900° C. in the presence of an inert or reducing gas at atmospheric pressure, e.g., hydrogen. At that temperature, the sodium chloride melted and was absorbed by the pores of the tungsten body by capillary action.

As far as expelling of the salt from the body after the machining is concerned, at a temperature of 1100° C., the sodium chloride has a vapor pressure of 25 mm. of Hg. Hence, in vacuum, volatilization of the salt is very rapid. Another advantage of the salt is that at about 1800° C., its vapor pressure is above atmospheric pressure. Hence, the salt can be expelled in an inert atmosphere at atmospheric pressure, which was impossible when copper was employed as the metal filler. Specifically, the tungsten body can again be placed in an open, bell-jar type of furnace, and while hydrogen or nitrogen or other inert gas at atmospheric pressure flows therethrough, heated at an elevated temperature of about 1800° C., at which temperature the salt is volatilized completely from the porous body. Thus the need for expensive vacuum furnaces may be obviated. If time is not an important consideration, the salt also offers the additional advantage that it can be removed from the porous body, either in whole or in part, by leaching, specifically by placing the impregnated body in boiling, distilled water.

It will be noted that the invention has been described in connection with the manufacture of porous, tungsten articles. However, it will be appreciated that the principles of the invention, while having special application to tungsten articles, are applicable to other high-melting-point, metal, porous articles whose dimensions or shape require change, and which change is not readily effected by the ordinary machining techniques due to the porous structure of the article. Also other modifications of the invention will readily present themselves to those skilled in this art, and these also are to be considered as falling within the scope of the invention as defined in the appended claims.

What is claimed is:

1. A method of machining a fully-sintered, normally-unmachinable, tungsten body, comprising impregnating said body with molten sodium chloride at a temperature of about 900° C., thereafter machining the body, and thereafter heating the body in vacuum and at a temperature of about 1100° C. at which the sodium chloride is rapidly volatilized and expelled from the tungsten body.

2. A method of machining a fully-sintered, normally-unmachinable, tungsten body, comprising impregnating said body with molten sodium chloride, thereafter machining the body, and thereafter heating the body in a non-oxidizing environment at atmospheric pressure and at a temperature of about 1800° C. at which the sodium chloride is volatilized and expelled from the tungsten body.

3. A method of machining a fully-sintered, normally-unmachinable, porous, tungsten body, comprising impregnating the pores of said body with a molten substance selected from the group consisting of sodium chloride, sodium fluoride, potassium chloride, potassium bromide, potassium iodide, rubidium chloride, rubidium bromide, rubidium iodide, cesium bromide and cesium iodide, thereafter machining the impregnated body, and thereafter heating the body in a non-oxidizing atmosphere at an elevated temperature at which the vapor pressure of the substance is substantially above the pressure of the atmosphere to volatilize the substance and expel it completely and rapidly from the tungsten body.

References Cited in the file of this patent

UNITED STATES PATENTS

| | | |
|---|---|---|
| 2,447,980 | Hensel | Aug. 24, 1948 |
| 2,663,928 | Wheeler | Dec. 29, 1953 |
| 2,669,008 | Levi | Feb. 16, 1954 |
| 2,765,524 | Lenel | Oct. 9, 1956 |